US006243415B1

(12) United States Patent
Pipon et al.

(10) Patent No.: US 6,243,415 B1
(45) Date of Patent: Jun. 5, 2001

(54) PROCESS OF MULTISENSOR EQUALIZATION ALLOWING MULTISENSOR RECEPTION IN THE PRESENCE OF INTERFERENCE AND MULTIPLE PROPAGATION PATHS AND RECEIVER FOR THE IMPLEMENTATION THEREOF

(75) Inventors: François Pipon, Paris; Didier Pirez, St Gratien; Pierre Vila, Rueil-Malmaison, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/091,234

(22) PCT Filed: Dec. 4, 1996

(86) PCT No.: PCT/FR96/01927

§ 371 Date: Jun. 15, 1998

§ 102(e) Date: Jun. 15, 1998

(87) PCT Pub. No.: WO97/23061

PCT Pub. Date: Jun. 26, 1997

(30) Foreign Application Priority Data

Dec. 15, 1995 (FR) .................................................. 95/14914

(51) Int. Cl.⁷ .............................. H03H 7/30; H03H 7/40; H03K 5/159
(52) U.S. Cl. ........................... 375/232; 455/307; 703/323
(58) Field of Search ................................... 375/232, 229, 375/230, 231, 278, 284, 285, 260, 346, 349, 350, 347, 344, 340; 455/137, 273, 67.3, 132, 307; 708/323, 322

(56) References Cited

U.S. PATENT DOCUMENTS 5,425,059 * 6/1995 Tsujimoto .............................. 375/347
5,844,951 * 12/1998 Proakis et al. ......................... 375/347

* cited by examiner

*Primary Examiner*—Chi Pham
*Assistant Examiner*—Phuong Phu
(74) *Attorney, Agent, or Firm*—Oblon, Spivak, McClelland, Maier & Neustadt, P.C.

(57) ABSTRACT

A process for calculating on the one hand the coefficients of a spatial filter applied to the signals emanating from the third step and on the other hand the coefficients of a temporal filter applied to the replica signal, made up either of the known symbols for the learning sequences, or from the demodulated symbols for the information sequences, the coefficients of these two filters being calculated so as to minimize, under a specified constraint, a criterion of mean square error between the output signal from the spatial filter and the output signal from the temporal filter, and consisting in filtering the signals emanating from the third step with the aid of the thus calculated coefficients of the spatial filter, thus optimizing the gain of the array of sensors in the direction of the useful signal at the output of the spatial filtering and ensuring rejection of the interference.

The signal (y(t)) obtained at the output of the spatial filtering subsequently undergoes one-dimensional equalization at a symbol rate deciding the symbols transmitted, the coefficients of the spatial and equalizing filters being updated according to a specified sequencing.

26 Claims, 4 Drawing Sheets

PROCESS OF MULTISENSOR EQUALIZATION ALLOWING MULTISENSOR RECEPTION IN THE PRESENCE OF INTERFERENCE AND MULTIPLE PROPAGATION PATHS AND RECEIVER FOR THE IMPLEMENTATION THEREOF

BACKGROUND OF THE INVENTION

1. Field of the Invention

The invention relates to a process of multisensor equalization allowing the demodulation of a digital message of serial digital modulation type in the presence of multiple propagation paths and interfering sources, also called jammers in respect of modulations formed from frames comprising learning sequences and information symbol sequences. It is based on the techniques of antenna processing and therefore requires the use of an array containing several sensors.

2. Discussion of the Background

For numerous applications in digital radio communications, transmission between the transmitter and the receiver occurs along several propagation paths. Since the delay time between the various paths may be greater than the symbol duration, equalization becomes necessary in order to compensate for the inter-symbol interference (ISI) thus generated.

This phenomenon occurs in particular in the HF range, where the multiple propagation paths arising from the reflections off the various ionospheric layers, may be 5 ms apart, i.e. several times the symbol duration (for modulations whose bandwidth is typically of the order of 3 kHz). It also occurs in other frequency ranges in respect of very high speed communications, of the GSM type (270 kbits/s, i.e. a symbol duration of 3.7 $\mu$s), in, an urban or mountainous setting, where the various paths stemming from reflections off various obstacles (buildings, mountains, etc.) may be separated by 10 or even 20 $\mu$s.

The invention may therefore be applied in particular to the high-frequency (HF) range which is of particular interest to radio communications since it allows long-distance communications on account of the phenomena of reflection off the various layers of the ionosphere, or else in respect of GSM-type applications. The invention may also lead to an increase in the capacity of cellular radio communication systems by allowing the implementation of Space Division Multiple Access (SDMA) techniques which consist in allowing several users who are sufficiently far apart spatially to use the same frequency at the same time.

In many systems currently in service, adaptation to the conditions of propagation is made possible by inserting learning sequences, which are known to the receiver, into the waveform. Various solutions are then possible for carrying out adaptive equalization of the useful signal received, the two most common being:

equalization by a Viterbi algorithm, requiring prior estimation of the propagation channel using the learning sequence. This equalization has the advantage of minimizing the probability of error with regard to the complete sequence of information signals, but it becomes very expensive when the duration of the impulse response of the channel is much greater than the symbol duration Ts. This is because the number of states which the Viterbi algorithm must process is equal to $M^L$, where M is the size of the alphabet of the modulation and L the length of the impulse response of the channel in terms of number of symbol periods. This solution is used for GSM-type applications where the Viterbi algorithm typically contains 32 states (L=5 and M=2).

In the HF range, the number of states becomes too large for the Viterbi algorithm to be usable (typically, M is equal to 4 or 8, and L is equal to 12, corresponding to an impulse response stretching over 5 ms) and the second solution using a DFE equalizer, standing for "Decision Feedback Equalizer", is often used.

This second solution consists in using the learning sequences to optimize a MSE (Mean Square Error) criterion. The equalizer attempts to provide the decision facility, adapted to the modulation, with a signal devoid of ISI, or in which the ISI has been greatly reduced. For this purpose, the DFE equalizer uses transverse filters and auto-adaptive recursive filters, which are adapted by an algorithm of the recursive least squares type (preferably to a gradient algorithm for reasons of speed of convergence) or are calculated directly from an estimate of the transmission channel—see in this respect the article by P. K. Shukla and L. F. Turner, "Channel-estimation-based adaptive DFE for fading multipath radio channels", Proc. of 1989 International Conference on Communications, ICC'89[1]. In the learning sequences, the known symbols are used to adapt the various coefficients. The tracking of the channel variations outside of the known sequences is ensured by using the symbols as and when decided as replica.

In the HF range, the various propagation paths are usually affected by flat "fading". When this "fading" is large, the performance of the DFE equalizer is degraded.

On the other hand, when jamming is present, these techniques rapidly become ineffective and special anti-jamming techniques are necessary, such as error-correcting coding, the removal of jamming by notch filtering or the use of frequency-hopping links. These techniques, used in numerous operational systems, are nevertheless limited when the interference is strong and occupies the whole of the useful signal band. Under these conditions, higher-performance anti-jamming means should be used, based on the use of antenna filtering techniques.

Antenna filtering techniques, which appeared in the early 1960s and are described in particular in an article by P. W. Howells, "Explorations in fixed and adaptative resolution at GE and SURC", IEEE Trans-Ant-Prop, Vol. AP-24, No. 5, pp 575–584, September 1976 [2], an exhaustive overview of which is presented in a thesis by P. Chevalier, "Antenne adaptative: d'une structure linéaire à une structure non linéaire de Voltera [Adaptative antenna: from a linear structure to a nonlinear Voltera structure]", June 1991 [3], aim to combine the signals received by the various component sensors of the antenna, in such a way as to optimize the response of the latter to the useful-signal and jammers scenario.

The choice of sensors and of their arrangement is an important parameter and has a major influence on performance. Three types of possibilities may be envisaged:

the sensors are identical and arranged at various points in space, discrimination between the useful signal and the jammers being effected via the direction of arrival, the sensors are arranged at one point in space (co-localized antenna) and possess different radiation patterns. Discrimination may then be effected according to polarization and direction of arrival, the above two possibilities can be combined: several co-localized antennas may be arranged at various points in space.

However, since the propagation and jamming conditions may alter over time, it is necessary to be able to adapt the antenna in real time to these variations through the use of a particular antenna filtering technique: the adaptative antenna. An adaptative antenna is an antenna which detects the sources of interference automatically, while constructing holes in its radiation pattern in their direction, while simultaneously improving the reception of the useful source, without a priori knowledge about the interference and on the basis of minimum information about the useful signal. Moreover, on account of the tracking ability of the algorithms used, an adaptative antenna is capable of responding automatically to a changing environment.

Adaptative antennas are characterized by the way in which they discriminate between the useful signal and the jammers, that is to say by the nature of the information about the useful signal which they exploit. This discrimination can be effected in five different ways according to [3]:

- based on direction of arrival,
- based on modulation,
- based on time, for example, for frequency-hopping links,
- based on power
- blindly (for example, the higher-order source separation methods).

Until very recently, transmission systems were still envisaged as operating independently of the adaptative antenna and single-sensor adaptative equalization techniques, this leading to sub-optimal performance.

Thus, the Dobson system described in U.S. Pat. No. PCT/AU85/00157 by R. Dobson entitled "Adaptative antenna array", February 1986 [4], which uses time-based discrimination, succeeds in effectively rejecting the jammers but does not seek to optimize the useful signal/background noise ratio. Moreover, it can only be used when the waveform allows reception when no useful signal is present.

Within a transmission context, and when learning sequences are introduced into the waveform, it is preferable to use antenna processing techniques with modulation-based discrimination since these make it possible to optimize the useful signal/noise ratio, while avoiding the implementation of a direction-finding step. However, those which are employed nowadays use complex weights in respect of each of the sensors of the adaptative antenna which are adapted via a criterion of minimization of an MSE between the output signal of the antenna and a replica signal. Such an antenna, known as an SAFR (Spatial Adapted Filter adapted with the aid of a Replica), allows the rejection of jammers, but in the presence of multiple propagation paths, it:

- "points" in the direction of one of the paths (the one which is correlated with the replica), that is to say puts the contributions from this path back into phase on the various sensors (for omnidirectional sensors a gain is therefore obtained in the signal-to-noise ratio of 10 log N, where N is the number of sensors used),
- and attempts to reject the uncorrelated paths thereof (thus losing the energy associated with these paths), the latter being viewed by the antenna as completely separate jammers. Such an antenna can therefore be greatly impaired in the presence of several useful propagation paths. This is because the uncorrelated useful paths may be rejected to the detriment of the rejection of the jammers, and the performance of the multisensor receiver may even become poorer than that of the single-sensor receiver when two temporally uncorrelated propagation paths are highly correlated spatially.

To improve the performance of this latter antenna processing technique, the idea is to couple it with a single-sensor equalization technique. Multisensor equalizers are thus obtained which comprise a spatial part, composed of various filters arranged on each of the reception pathways, and a temporal part arranged at the output of the spatial part.

Several multisensor equalizers of this type have already been proposed and studied, essentially within the field of mobile radio transmissions. See in this regard the articles by K. E. Scott and S. T. Nichols, "Antenna Diversity with Multichannel Adaptative Equalization in Digital Radio" [5] and P. Balaban and J. Salz, "Optimum Diversity Combining and Equalization in Digital Data Transmission with Applications to Cellular Mobile Radio—Part 1: Theoretical Considerations", IEEE Trans. on Com., Vol. 40, No. 5, pp 885–894, May 1992 [6]. They have up until now been envisaged for combating the selective "fading" created by the multipaths, in an unjammed environment. These equalizers consist of Finite Impulse Response filters, one on each of the pathways, followed by an adder, and then by a symbol-rate one-dimensional equalizer. The criterion used to optimize these multisensor equalizers is that of minimizing the MSE between their output and a replica.

In the equalizer proposed by Scott et al. [5], the adaptation of the coefficients is performed by a least squares algorithm, and its use in respect of an HF channel cannot be envisaged for the waveforms used, since, if the temporal spreading of the multipaths is taken into account, the number of coefficients to be adapted is too large for the algorithm to be able to converge on the learning sequence.

In the equalizer proposed by Balaban et al. [6], the coefficients are calculated after estimating the propagation channel. The article does not tackle the problem of a jammed environment.

A multisensor equalizer which leads to an improvement in the performance of existing multisensor equalizers, in particular by allowing anti-jamming, has formed the subject of a patent application filed in France by the Applicant on Feb. 25, 1994, entitled "Procédé permettant une égalisation multivoies dans un récepteur radioélectrique, en présence d'interférences et de multitrajets de propagation [Process allowing multichannel equalization in a radio receiver, in the presence of interference and multiple propagation paths]" [7], and published as No. 2 716 761. Spatial-diversity equalizers based on an estimate of the transmission channel and operating in an unjammed environment can be made robust by this equalizer by incorporating a jammer rejection function (performed by reprocessing sensor signals) therein. This equalizer is of special interest since it is optimal when the noise is temporally white (temporally white jammer(s) and background noise and jammer(s) possessing a single propagation path), irrespective of the number of paths associated with the useful signal. On the other hand, its implementation requires a computational power which may become large when the length of the impulse response of the useful propagation channel increases, and this may become injurious for certain applications.

SUMMARY OF THE INVENTION

The object of the invention is to alleviate this drawback.

To this end, the subject of the invention is a process of multisensor equalization in a radio receiver, of the type comprising an array of sensors and a spatial filtering part coupled to a temporal filtering part each comprising a specified number of coefficients, allowing the demodulation of a digital message of serial digital modulation type received by the receiver, in the presence of multiple propagation paths and interfering sources, in respect of modulations formed from frames comprising learning sequences and information sequences, characterized in that it comprises:

a first step consisting in digitizing the signal received by each sensor, in transforming the digitized signal to baseband, and in filtering the baseband signal by a low-pass filtering, a second step consisting in performing a seizure of synchronization on the signals emanating from the first step, in estimating the useful paths and the frequency shift resulting from inaccuracies in the transmission and reception frequencies and from ionospheric propagation, a third step consisting in compensating for the shift in frequency of the signals delivered by each sensor, on the basis of the estimation performed in the second step, a fourth step consisting in calculating on the one hand the coefficients of a spatial filter applied to the signals emanating from the third step and on the other hand the coefficients of a temporal filter applied to the replica signal, made up either of the known symbols for the learning sequences, or from the demodulated symbols for the information sequences, the coefficients of these two filters being calculated so as to minimize, under a specified constraint, a criterion of mean square error between the output signal from the spatial filter and the output signal from the temporal filter, and consisting in filtering the signals emanating from the third step with the aid of the thus calculated coefficients of the spatial filter, thus optimizing the gain of the array of sensors in the direction of the useful signal at the output of the spatial filtering and ensuring rejection of the interference, and a fifth step consisting in equalizing the signal emanating from the fourth step by one-dimensional equalization at a symbol rate deciding the symbols transmitted;

the coefficients of the spatial and equalizing filters as well as the estimate of the useful channel being updated according to a specified sequencing of the frames.

The subject of the invention is also a multiplier receiver for implementing the process according to the invention.

The main advantage of the invention is that it is implemented by a multisensor equalizer, which leads to slightly poorer performance than the equalizer according to [7], but is less complex numerically.

Although the process according to the invention is implemented on the basis of a multisensor equalizer possessing lower computational power than that of the abovementioned equalizer, it nevertheless performs a jammer rejection function. Furthermore, it improves the performance of the SAFR: the spatial filtering of the input signals is performed by a structure identical to the SAFR, a narrow-band structure comprising one complex coefficient per pathway, but the criterion of optimized MSE is different. Unlike the SAFR, the algorithm does not optimize the MSE between the output from the spatial part and a replica signal (correlated with one of the paths associated with the useful signal), but the MSE between the output from the spatial part and the output from a temporal filter at whose input the replica signal is present. The process according to the invention allows the spatial part to reject only the interference, and not the multipaths associated with the useful signal which are uncorrelated with the replica. It therefore leads to a general improvement in the performance of the SAFR.

BRIEF DESCRIPTION OF THE DRAWINGS

Other advantages and characteristics of the present invention will emerge more clearly on reading the description which follows and the appended figures which represent.

DETAILED DESCRIPTION OF THE PREFERRED EMBODIMENTS

The output from the spatial part is processed by a symbol-rate one-dimensional equalizer which decides the symbols transmitted. This equalizer may in particular be based on a Viterbi algorithm, or be a DFE equalizer.

The present invention therefore carries out the following functions jointly:

rejection of jammers, optimization of the gain in the direction of the useful signal, reduction in the distortions created by the multipaths associated with the useful signal.

The first two functions are performed by the spatial part, and the third by the equalizer placed at the output thereof.

An exemplary embodiment is given below within the context of HF transmissions using QPSK ("Quadri-Phase-Shift Keying") modulation:

½ Nyquist transmission filter whose 3 dB band is 2400 Hz, bit rate equal to 2400 baud, symbols transmitted made up of frames of 256 symbols comprising an 80-symbol learning sequence placed at the start of the frame (to perform synchronization and to calculate the coefficients of the equalizer), followed alternately by sequences of 32 information symbols and sequences of 16 known symbols (to allow the equalizer to track the variations in the channel).

Figure 1:
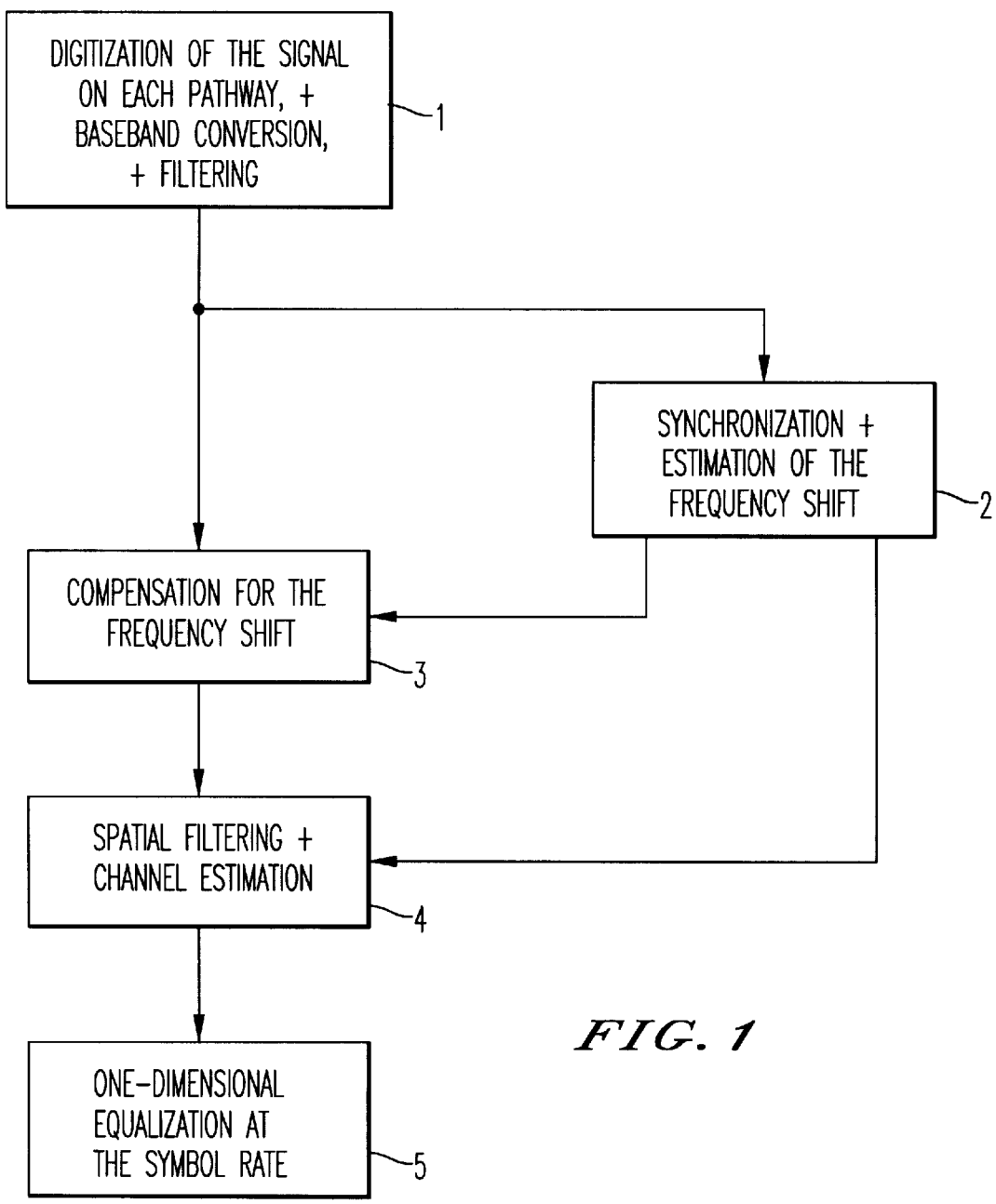
FIG. 1, the main steps of the process according to the invention.

The process according to the invention, illustrated in FIG. 1, comprises five main steps 1 to 5:

a first step 1 for digitizing the signal on each pathway, the baseband conversion thereof and Nyquist filtering thereof, a second step 2 for synchronizing the signal and estimating the frequency shift, resulting from the inaccuracies in the transmission and reception frequency synthesizers and ionospheric propagation, a third step 3 for compensating for the frequency shift in the sensor signals, a fourth step 4 of spatial filtering of the signals and for estimating the useful channel at the output of the spatial filter, which carries out interference rejection and optimizes the gain in the direction of the useful signal, and a fifth step 5 of one-dimensional equalization at a symbol rate, which decides the symbols transmitted (decided symbols).

The coefficients of the spatial and equalizing filters as well as the estimate of the useful channel are updated at the start of each of the information sequences SI of the current frame.

In the exemplary embodiment which relates to the HF range, equalization is performed by a DFE equalizer, the coefficients of which can be calculated either directly from the estimate of the useful channel at the output of the spatial filter, or by an adaptive algorithm operating independently of the spatial filtering.

Figure 2:
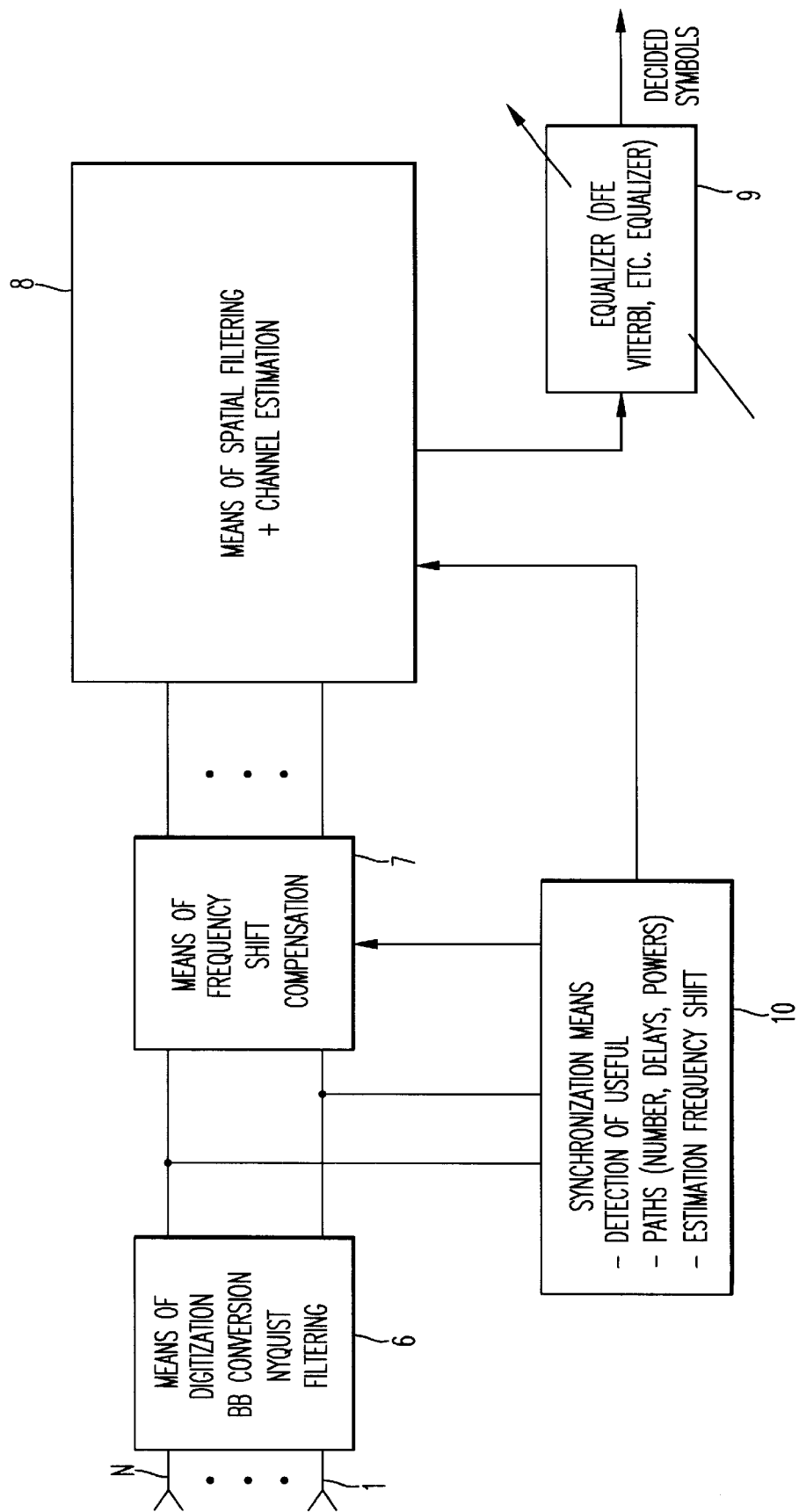
FIG. 2, a functional diagram of a multisensor receiver for implementing the process according to the invention, FIG. 3, a functional diagram of the spatial filtering and channel estimation means according to the invention, and FIGS. 4 and 5, the updating and chaining of the processing operations of the receiver implementing the process according to the invention.

The process according to the invention is implemented by a multisensor receiver a functional diagram of which is illustrated in FIG. 2.

It comprises an array of sensors 1 to N, coupled to the input of means 6 for digitization, baseband band conversion and low-pass filtering of the signals received by the array of sensors. They are output-coupled to means 7 for compensating for the frequency shift between the transmission and reception frequencies, which means are themselves output-coupled to means 8 of spatial filtering and channel estimation. The output of the spatial filtering means 8 is coupled to the input of an equalizer 9, for example a DFE, Viterbi or other equalizer.

Synchronizing means 10 receive the signals delivered by the digitization, baseband conversion and low-pass filtering means 6 and inject their own information into the frequency-shift compensation means 7 (information relating to the estimation of the frequency shift) and into the spatial filtering and channel estimation means 8 (information relating to the detection of the useful paths: number, delays, powers).

A transmitted signal d(t) arrives at the array of sensors 1 to N, also referred to as an antenna, comprising N sensors, after it has passed through the ionospheric channel. Each of the P propagation paths is received by the antenna with a complex gain $\alpha_i(t)$ and a delay $\tau_i$ with respect to the signal transmitted. Let $\vec{x}(t)$ be the vector formed by the signals received by the N component sensors of the antenna:

$$\vec{x}(t) = \sum_{i=1}^{P} \alpha_i(t) d(t - \tau_i) \vec{s}_i + \vec{b}(t) \qquad (1)$$

where:

$\vec{s}_i$ is the direction vector associated with path i, $\vec{b}(t)$ is additive noise, which is independent of the useful signal and takes into account the contributions from background noise and jammers.

The non-stationarity of the channel impinges on the amplitudes and phases of the various paths, and hence on the time-dependence of the quantities $\alpha_i(t)$. On the other hand, the delays $\tau_i$ are relatively steady over durations of the order of a quarter of an hour and can therefore be regarded as constant.

In the signal digitization and Nyquist filtering step 1, the signals are digitized at a frequency which is a multiple of the symbol frequency, so as to obtain sufficient accuracy with regard to the instant of synchronization. For the exemplary embodiment described, the signals are digitized at 9600 Hz, this corresponding to an oversampling by a factor of 4. The signals are next transposed to baseband and then filtered by a low-pass filter, of the Nyquist type for example.

The multisensor equalization implemented by the invention is necessarily preceded by a synchronization step 2. This step 2 implements a multisensor synchronization process described in particular in a patent filed by the Applicant on Jan. 21, 1994, entitled "Synchronisation en présence de brouilleurs et de multitrajets [Synchronization in the presence of jammers and multipaths]", published as No. 2 715 488 [8], or any other process allowing synchronization in the presence of jammers and multipaths. It is used in order to:

perform the seizure of synchronization, estimate the number of paths, as well as the delay times relating to the various paths and their relative powers, estimate the frequency shift between the synthesizers at the transmitting and receiving ends. This frequency shift is compensated for before carrying out the multisensor equalization.

Let Te denote the sampling period in respect of synchronization and Ts the symbol-period of the modulation transmitted $$Te = \frac{Ts}{4}$$

in the exemplary embodiment described).

The estimated delay times can be expressed as a function of Te, $\tau_i = \rho_i$ Te, and the sampled signal received by the antenna can then be written:

$$\vec{x}(nTe) = \sum_{i=1}^{P} \alpha_i(nTe) d(nTe - pi\,Te) \vec{s}_i + \vec{b}(nTe) \qquad 2)$$

The computation algorithm of the spatial part works at the symbol rate, the input signal sampled at the symbol rate being written:

$$\vec{x}(n) = \sum_{i=1}^{P} \alpha_i(n) d(nTs - pi\,Te) \vec{s}_i + \vec{b}(n) \qquad (3)$$

Step 3 makes it possible to compensate for the frequency shift (3) $\Delta f$ estimated at the completion of the synchronization step. This shift is compensated for in the input signals by applying the following formula:

$$\vec{x}'(n) = \vec{x}(n) \exp\left(-j\Delta f \frac{n}{Fs}\right) \qquad (4)$$

Figure 3:
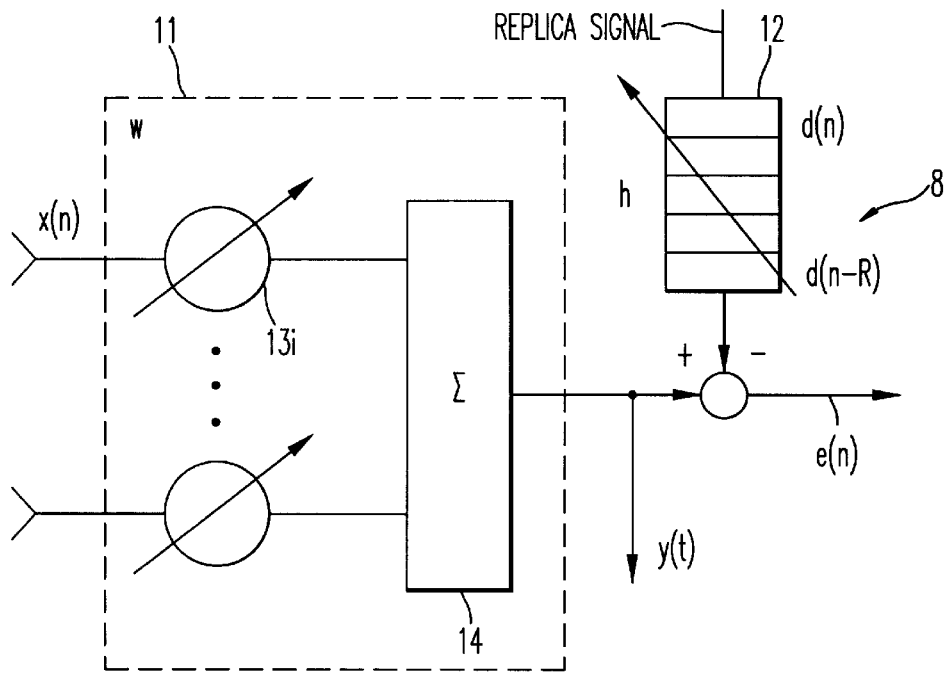

A structure of the spatial filtering and channel estimation means 8 is illustrated by the diagram of FIG. 3.

It comprises a spatial filtering part 11 delimited by a discontinuous closed line and a temporal filtering part 12. The spatial filtering part 11 implements a filter 13$_i$ with a single complex coefficient per pathway, which makes it possible to weight the input signal by a first weighting vector $\vec{w}$. The signals arising from each complex coefficient are summed by a summator 14. The temporal filtering part 12 implements a temporal filter comprising R+1 coefficients which makes it possible to weight the replica signal by a second weighting vector $\vec{h}$. The vector $\vec{h}$ makes it possible to obtain an estimate of the useful channel at the output of the spatial part 11. The output signal from the spatial part, denoted $y(t) = \vec{w}^+ \vec{x}(t)$, is then supplied to the DFE equalizer 9 coupled to the output of the spatial part 11.

Letting $\vec{d}(n) = [d(nTs), d(n-1)Ts, \ldots, d(n-R)Ts]^T$, be the input vector of the temporal part 12, sampled at the symbol rate, then the optimized criterion for calculating $\vec{h}$ and $\vec{w}$ is an MSE criterion which is expressed by the following formula:

$$MSE = E[\|e(t)\|^2] = E[\|\vec{w}^+ \vec{x}(t) - \vec{h}^+ \vec{d}(t)\|^2] \qquad (5)$$

where $\|e(t)\|$ corresponds to the norm of e(t) and $E[\|\vec{w}^+ \vec{x}(t) - \vec{h}^+ \vec{d}(t)\|^2]$ to the mathematical expectation, and writing:

$$R_{XX} = E[\vec{x}(t)(\vec{x}(t))^+],$$

$$R_{DX} = E[\vec{d}(t)(\vec{x}(t))^+],$$

$$R_{DD} = E[\vec{d}(t)(\vec{d}(t))^+].$$

The superscript "+" designating the conjugate transpose operator.

The minimized criterion is expressed by the following formula:

$$MSE = \vec{w}^+ R_{XX}\vec{w} - \vec{h}^+ R_{DX}\vec{w} - \vec{w}^+ R_{DX}^+ \vec{h} - \vec{h}^+ R_{DD}\vec{h} \quad (6)$$

Since the minimization of this criterion leads to the null solution, it is necessary to append a constraint. Two types of constraints may be envisaged:

a first constraint or $\vec{h}^+\vec{h}=1$, that is to say a norm constraint on the vector $\vec{h}$, and a second constraint or $\vec{h}^+\vec{f}=1$, where $\vec{f}$ is a vector with (R+1) components containing R zeros and one one corresponding to the path of index $i_0$ of highest power (which path is determined through the synchronization 2): $\vec{f} = [0, \ldots, 0, 1, 0, \ldots, 0]^T$ where the superscript "T" denotes the transpose operator. This constraint allows the spatial part 11 to "point" in the direction of the principal path.

Advantageously, the synchronization 2 is performed in such a way that the delay of the path of index $i_0$ is a multiple of the symbol period.

The calculation of the solution to the optimization problem is described below for each of the above constraints.

Taking the constraint $\vec{h}^+\vec{f}=1$, and letting $\vec{h}'$, respectively $\vec{d}'$, denote the vector with R coefficients which is formed from $\vec{h}$, respectively $\vec{d}$, by deleting the component $i_0$, the minimized MSE can be written:

$$MSE = E[\|e(t)\|^2] = E[\|\vec{w}^+\vec{x}(t) - \vec{h}'^+\vec{d}'(t) - d(t - p_{io}Te)\|]^2 \quad (7)$$

and the solution to the minimization problem is given by Wiener's formula:

$$\begin{bmatrix} \vec{w} \\ -\vec{h}' \end{bmatrix} = \left\{ E\left[\begin{pmatrix} \vec{x}(t) \\ \vec{d}'(t) \end{pmatrix} (\vec{x}(t)^+ \vec{d}'(t)^+) \right] \right\}^{-1} E\left[\begin{pmatrix} \vec{x}(t) \\ \vec{d}'(t) \end{pmatrix} d(t - p_{io}Te)^* \right] \quad (8)$$

the superscript "+" designating the conjugate operator.

Writing:

$$R_{D'X} = E[\vec{d}'(t)(\vec{x}(t))^+],$$

$$R_{D'D'} = E[\vec{d}''(t)(\vec{d}''(t))^+],$$

$$\vec{r}_{Xd} = E[\vec{x}(t)(d(t - p_{io}Te))^*],$$

$$\vec{r}_{D'd} = E[\vec{d}''(t)(d(t - p_{io}Te))^*].$$

We obtain the following two equations:

$$R_{XX}\vec{w} - R_{D'X}^+ h' = \vec{r}_{Xd}$$

$$R_{D'X}\vec{w} - R_{D'D'} h' = \vec{r}_{D'd}$$

The vector $\vec{h}'$ is therefore expressed as a function of the vector $\vec{w}$:

$$\vec{h}' = R_{D'D'}^{-1}(R_{D'X}\vec{w} - \vec{r}_{D'd}) \quad (9)$$

and the vector $\vec{w}$ can be written:

$$\vec{w} = A^{-1}(\vec{r}_{Xd} - R_{D'X}^+ R_{D'D'}^{-1} \vec{r}_{D'd}) \quad (10)$$

with:

$$A = R_{XX} - R_{D'X}^+ R_{D'D'}^{-1} R_{D'X} \quad (11)$$

To provide a better understanding of the behaviour of the spatial part 11, the expression for the filters $\vec{w}$ and $\vec{h}'$ when the array receives two useful paths $\vec{s}_1$ and $\vec{s}_2$, whose contributions are uncorrelated, is given below:

$$\vec{x}(t) = \alpha_1 d(t)\vec{s}_1 + \alpha_2 d(t-\tau)\vec{s}_2 + \vec{b}(t).$$

Under these conditions, the matrix $R_{D'X}$ may be expressed, assuming also that the symbols transmitted are mutually uncorrelated ($R_{D'D'}=$Id, where Id corresponds to the Identity matrix and $\vec{r}_{D'd}=0$), as follows:

$$R_{D'X} = \alpha_2^*[0, \ldots \vec{s}_2^+, 0, \ldots 0]^T,$$

where the vector $\vec{s}_2^+$ is placed in the row corresponding to the delay $\tau$.

We therefore obtain:

$$A = R_{XX} - |\alpha_2|^2 \vec{s}_2 \vec{s}_2^+,$$

i.e., letting R denote the correlation matrix for the background noise component+jammers:

$$A = |\alpha_1|^2 \vec{s}_1 \vec{s}_1^+ + |\alpha_2|^2 \vec{s}_2 \vec{s}_2^+ + R - |\alpha_2|^2 \vec{s}_2 \vec{s}_2^+ = |\alpha_1|^2 \vec{s}_1 \vec{s}_1^+ + R.$$

The matrix A therefore corresponds to the correlation matrix $R_{XX}$ which would be obtained in the presence of the first path only. Moreover, the second path does not come into the correlation vector $\vec{r}_{Xd}$.

The weight vector defining the spatial part 11 is therefore the weight vector corresponding to the SAFR adapted to path 1, as if the second path were not present. Thus, the antenna "points" its main lobe in the direction of path 1 and places zeros in the direction of the jammers. The gain in the direction of path 2 is a priori arbitrary. At the output of the spatial part 11, the second path is therefore not eliminated and an equalization of the signal at the output is necessary.

Considering the second constraint $\vec{h}^+\vec{h}=1$, minimization of the MSE is obtained, for a vector $\vec{w}$ which zeros the gradient of the criterion with respect to $\vec{w}$ through the following formula:

$$\nabla_w MSE = R_{XX}\vec{w} - R_{DX}^+ \vec{h} \quad (12)$$

The vector $\vec{w}$ is expressed as a function of the vector $\vec{h}$ by the following formula:

$$\vec{w} = R_{XX}^{-1} R_{DX}^+ \vec{h} \quad (13)$$

Replacing $\vec{w}$ by its value as a function of $\vec{h}$ in the expression for the minimized criterion, we obtain:

$$MSE = \vec{h}^+ (R_{DD} - R_{DX} R_{XX}^{-1} R_{DX}^+) \vec{h} \quad (14)$$

The vector $\vec{h}$ which is the solution to this problem is therefore the eigenvector associated with the minimum eigenvalue of the matrix B, with:

$$B = R_{DD} - R_{DX} R_{XX}^{-1} R_{DX}^+ \quad (15)$$

The vector $\vec{w}$ may be deduced from this using the formula (13).

The equalization step 5 is implemented by an equalizer 9 of the single-sensor DFE type. It consists of a transverse filter, not represented, at the symbol rate, and of a recursive filter. The input signal for the transverse filter is the signal emanating from the spatial filtering means 8: $y(t) = \vec{w}^+ \vec{x}(t)$. The input signal for the recursive filter is formed from the known symbols of the learning sequences SA and from the decided symbols. A decision facility, not represented either, is placed at the output of the transverse and recursive filters and allows access to be had to the useful symbols transmitted.

Figure 4:
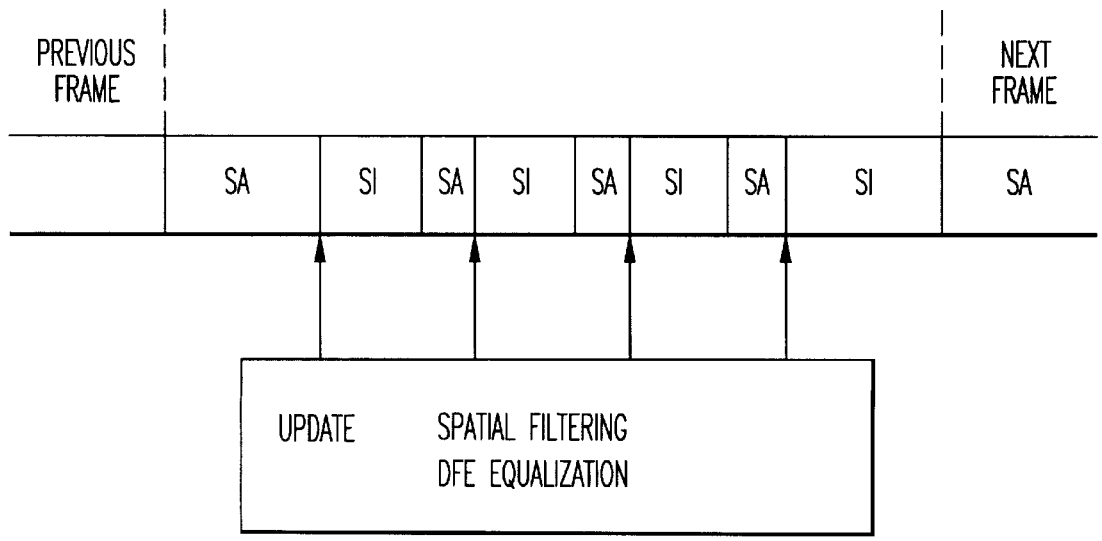
Figure 5:

The processing operations are performed according to a timing diagram illustrated by FIGS. 4 and 5.

In a first step, the weighting vectors $\vec{w}$ and $\vec{h}$ are updated at the start of each of the information sequences SI (=end of the learning sequences SA), i.e. four times per frame in the example considered. This updating thus ensures correct tracking of the non-stationarities of the useful propagation channel and jammer(s).

In a second step, the data supplied to the DFE equalizer 9 so that it can demodulate the next information sequence SI, are filtered with the aid of the vector $\vec{w}$. The vector $\vec{h}$ can be used to calculate the coefficients of the DFE equalizer 9 directly.

In a third step, the DFE equalizer 9 demodulates the information sequence SI.

In a fourth step, the symbols of the information sequence SI which are demodulated by the equalizer 9 and the known symbols of the next learning sequence SA are used as inputs to the algorithm for estimating $\vec{w}$ and $\vec{h}$ (tracking of the variations in the propagation channel).

The calculation of the weighting vector $\vec{w}$ allowing calculation of the output from the spatial part 11 and calculation of the estimate of the useful channel $\vec{h}$ at the output of the spatial filtering 8 is performed jointly while optimizing the criterion described above.

The calculation of the weightings can be performed in two modes:

A first initialization mode is used to calculate $\vec{w}$ and $\vec{h}$ over the first learning sequence SA of the first frame received, or when there are discontinuities in the processing (readjustment of synchronization for example). The calculation is performed over the L symbols of the learning sequence with the aid of formulae (9) (10) (11) (constraint $\vec{h}^+ \vec{f} = 1$) or (13)(14) (constraint $\vec{h}^+ \vec{h} = 1$), using the conventional unbiased estimator for calculating various correlations:

$$R_{UV} = \frac{1}{L-R} \sum_{k=R+1}^{} U(k) V(k)^+ \quad (16)$$

where $U(k)$ and $V(k)$ can represent $\vec{d}'(k)$, $\vec{x}'(k)$ or $d(t-p_{i0}Te)$ for the constraint $\vec{h}^+ \vec{f} = 1$, and $\vec{d}(k)$ or $\vec{x}(k)$ for the constraint $\vec{h}^+ \vec{h} = 1$. For this latter constraint, the calculation of $\vec{h}$ entails a eigenvalues, and eigenvectors which can be produced for example by a Jacobi algorithm.

(The summation begins with $k=R+1$) so as to take into account the fact that $\vec{d}(k)$ involves the symbols $d(k)$ to $d(k-R)$. It is possible to begin the summation for $k=1$ by regarding $d(k)=0$ for $k \leq 0$).

In the normal mode, the tracking of the variations in the useful propagation channel and jammer can be performed by several algorithms:

least squares algorithms with neglect factor: $\vec{w}$ and $\vec{h}$ are calculated over the symbols of the information sequence which has just been demodulated and over the learning sequence which follows it with the aid of formulae (9) (10) (11) (constraint $\vec{h}^+ \vec{f} = 1$) or (13) (14) (constraint $\vec{h}^+ \vec{h} = 1$), using a neglect factor $\lambda (0 < \lambda < 1)$ to calculate the various correlations at each iteration n:

$$R_{UV}(n) = \sum_{k=1}^{n} \lambda^{n-k} U(k) V(k)^+ \quad (17)$$

The calculation of $\vec{w}$ and $\vec{h}$ is then performed on the basis of these correlations for each iteration n corresponding to the start of an information sequence SI.

gradient algorithm with adaptive step. See in this regard an article by P. Bragard and G. Jourdain, "A fast self optimized LMS algorithm for non-stationary identification", IEEE proceedings ICASSP 1990, pp 1425–1428 [9] where $\vec{w}$ and $\vec{h}$ are calculated over the symbols of the information sequence SI which has just been demodulated and over the learning sequence which follows it by a gradient algorithm, the adaptation step of which is itself optimized in respect of the non-stationary channels.

It should be observed that the gradient algorithm with adaptive step is also used over the first learning sequence SA of the first frame, after the initialization of $\vec{w}$ and $\vec{h}$ described above has been performed. The data of this first sequence are therefore used twice, thus making it possible to obtain good initialization of the gradient algorithm.

The DFE equalization 9 which follows the spatial part 11 can be carried out by any existing type of DFE equalizer.

In a first type of DFE equalizer 9, the estimate $\vec{c}$ of the propagation channel at the output of the spatial part 11 is calculated firstly from $\vec{h}$, through the following formulae:

for the constraint $\vec{h}^+ \vec{f} = 1$:

$$\vec{c} = \vec{h} - \epsilon_{min} \vec{f},$$

where $\epsilon_{min}$ represents the minimum MSE of the criterion (5).

The components of $\vec{h}$ therefore give the coefficients of the channel at the output of the spatial part 11, except for the coefficient corresponding to the constraint, for which $\epsilon_{min}$ must be taken away.

for the constraint $\vec{h} + \vec{f} = 1$:

$$\vec{c} = (1 - \epsilon_{min})\vec{h} = (1 - \lambda_{min})\vec{h},$$

where $\lambda_{min}$ represents the minimum eigenvalue of the matrix B defined by formula (15).

The channel at the output of the spatial part 11 is proportional to $\vec{h}$, the proportionality factor being equal to $1 - \lambda_{min}$.

The coefficients of the DFE equalizer 9 are calculated secondly directly from the estimate $\vec{c}$ of the propagation channel [1]. The updating of the DFE equalizer 9 is therefore performed consecutively to that of the filters $\vec{w}$ and $\vec{h}$, at the start of each of the information sequences SI.

If this possibility is used, only the samples corresponding to the information sequences SI are filtered by the spatial part.

In a second type of DFE equalizer 9, the coefficients of the DFE equalizer 9 are calculated on the basis of an algorithm of the least squares type (for example the so-called "spatial trellis" algorithm detailed in the thesis by L. Fety, "Méthodes de traitement d'antenne adaptées aux radiocommunications [Antenna processing methods adapted to radiocommunications]", ENST doctoral thesis, June 1988 [10]) independently of the channel estimation. In this case, the known symbols are used as replica over the learning sequences SA and the demodulated symbols are used as replica over the information sequences SI. Consequently, unlike the previous case, all the samples have to be filtered by the spatial part (learning sequences SA and information sequences SI).

In a third type of DFE equalizer 9, the equalization can comprise, upstream, a filtering adapted to the channel, the output from which is sampled at the symbol rate and the input of which is sampled at one or two times the symbol rate. In this case, the output from the spatial part 11 is calculated with a rate compatible with the channel-adapted input of the filter. The channel estimation can be performed either independently of the calculation of the spatial part 11, or by taking the spatial part 11 into account and in the latter case the filter $\vec{h}$ must be sampled with a rate which is compatible with the sampling at the input of the channel-adapted filter. The DFE equalization 9 at the output of the adapted filter is then performed as in the first or second type of DFE equalizer.

The DFE equalizer 9 can be replaced, in particular for applications of the GSM type where the length of the channel impulse response expressed in terms of number of symbols is smaller, with a decision facility based on the Viterbi algorithm. The observations made above in respect of the DFE equalizer 9 are still valid:

the estimation of the useful channel at the output of the spatial filtering 11 can be done either independently of the calculation of the spatial part, or by using the vector $\vec{h}$.

if the vector $\vec{h}$ is used, it must be sampled at a rate equal to that at the input of the channel-adapted filtering.

What is claimed is:

1. Process of multisensor equalization in a radio receiver which includes an array of sensors and a spatial filter coupled to a temporal filter which perform filtering using plural coefficients, the radio receiver performing demodulation, in the presence of multiple propagation paths and interference sources, on a received serial digital modulated message which includes frames of learning and information sequences, the process comprising:

digitizing a signal received by each sensor;

transforming each digitized signal into a baseband signal;

filtering each baseband signal by low-pass filtering to produce a filtered signal;

synchronizing each filtered signal in order to obtain an estimate of useful paths of the signal and an estimate of a frequency shift in each filtered signal;

compensating for the frequency shift in each filtered signal, based on the estimate of the frequency shift, to produce a compensated signal;

calculating the coefficients of the spatial filter and using the spatial filter to filter and sum each compensated signal to produce a spatial filtered signal;

calculating the coefficients of the temporal filter and using the temporal filter to filter a replica signal and produce a temporal filtered signal, wherein the replica signal includes known symbols in a learning sequence or demodulated symbols in an information sequence;

iterating the steps of calculating the coefficients of the spatial and temporal filters so as to minimize under a predetermined constraint, a mean square error between the spatial filtered signal and the temporal filtered signal;

equalizing the spatial filtered signal by one-dimensional equalization at a symbol rate at which transmitted symbols are decided; and wherein the coefficients of the spatial and temporal filters and coefficients of an equalizing filter used in the equalizing step are updated according to a predetermined sequencing of the frames.

2. Process according to claim 1, further comprising:

estimating a useful channel at an output of the spatial filter using the coefficients of the temporal filter to produce a useful channel estimate, wherein the useful channel estimate is used to calculate the coefficients of the equalizing filter for the one-dimensional equalization.

3. Process according to claim 1, wherein the predetermined constraint is a constraint that satisfies $\vec{h} + \vec{f} = 1$, in which $\vec{f}$ is a vector with (R+1) components comprising a predetermined number R of components with a value of zero and one component with a value of one, the components corresponding to a highest-power path of the useful paths, and in which $\vec{h}$ is a vector of the coefficients of the temporal filter, the vector $\vec{h}$ being used to produced a useful channel estimate at an output of the spatial filter.

4. Process according to claim 2, wherein the predetermined constraint is a constraint that satisfies $\vec{h} + \vec{f} = 1$, in which $\vec{f}$ is a vector with (R+1) components comprising a predetermined number R of components with a value of zero and one component with a value of one, the components corresponding to a highest-power path of the useful paths, and in which $\vec{h}$ is a vector of the coefficients of the temporal filter, the weighting vector $\vec{h}$ being used to produce the useful channel estimate at the output of the spatial filter.

5. Process according to claim 1, wherein the predetermined constraint is a norm constraint, on a vector $\vec{h}$ of the coefficients of the temporal filter, that satisfies $\vec{h} + \vec{h} = 1$, the vector $\vec{h}$ being used to produced a useful channel estimate at an output of the spatial filter.

6. Process according to claim 2, wherein the predetermined constraint is a norm constraint, on a vector $\vec{h}$ of the coefficients of the temporal filter, that satisfies $\vec{h}+\vec{h}=1$, the vector $\vec{h}$ being used to produce the useful channel estimate at the output of the spatial filter.

7. Process according to claim 1, further comprising:
updating the coefficients of the spatial, temporal, and equalizing filters at a start of each information sequence in a frame; and
estimating the coefficients of the spatial and temporal filters using a demodulated information sequence and a learning sequence which follows the demodulated information sequence.

8. Process according to claim 2, further comprising:
updating the coefficients of the spatial, temporal, and equalizing filters at a start of each information sequences in a frame; and
estimating the coefficients of the spatial and temporal filters using a demodulated information sequence and a learning sequence which follows the demodulated information sequence.

9. Process according to claim 3, further comprising:
updating the coefficients of the spatial, temporal, and equalizing filters at a start of each information sequences in a frame; and
estimating the coefficients of the spatial and temporal filters using a demodulated information sequence and a learning sequence which follows the demodulated information sequence.

10. Process according to claim 4, further comprising:
updating the coefficients of the spatial, temporal, and equalizing filters at a start of each information sequences in a frame; and
estimating the coefficients of the spatial and temporal filters using a demodulated information sequence and a learning sequence which follows the demodulated information sequence.

11. Process according to claim 5, further comprising:
updating the coefficients of the spatial, temporal, and equalizing filters at a start of each information sequences in a frame; and
estimating the coefficients of the spatial and temporal filters using a demodulated information sequence and a learning sequence which follows the demodulated information sequence.

12. Process according to claim 6, further comprising:
updating the coefficients of the spatial, temporal, and equalizing filters at a start of each information sequences in a frame; and
estimating the coefficients of the spatial and temporal filters using a demodulated information sequence and a learning sequence which follows the demodulated information sequence.

13. Multisensor radio receiver for implementing multisensor equalization, comprising:
an array of sensors configured to receive a signal;
means, coupled to the array of sensors, for digitizing, baseband converting, and low-pass filtering the signal;
means, coupled to the means for digitizing, for synchronizing the digitized, baseband converted, and low-pass filtered signal;
means, coupled to the means for digitizing and controlled by the means for synchronizing, for compensating for a frequency shift in the digitized, baseband converted, and low-pass filtered signal;
means, coupled to the means for compensating and the means for synchronizing, for filtering the compensated signal, comprising,
means for spatial filtering the compensated signal comprising one complex coefficient for each pathway formed respectively by each sensor in the array of sensors,
means for temporal filtering a replica signal, and
means for minimizing a mean square error between an output of the means for spatial filtering and an output of the means for temporal filtering according to a predetermined constraint in order to calculated coefficients for the means for spatial filtering and the means for temporal filtering; and
means, coupled to the means for filtering, for equalizing the spatial filtered signal.

14. Multisensor radio receiver according to claim 13, further comprising:
means for estimating a useful channel at an output of the means for spatial filtering using the coefficients of the means for temporal filtering to produce a useful channel estimate, wherein the useful channel estimate is used to calculate coefficients of the means for equalizing.

15. Multisensor radio receiver according to claim 13, wherein the predetermined constraint is a constraint that satisfies $\vec{h}+\vec{f}=1$, in which $\vec{f}$ is a vector with (R+1) components comprising a predetermined number R of components with a value of zero and one component with a value of one, the components corresponding to a highest-power path of useful paths, and in which $\vec{h}$ is a vector of the coefficients of the means for temporal filtering, the vector $\vec{h}$ used to produce a useful channel estimate at the output of the means for spatial filtering.

16. Multisensor radio receiver according to claim 14, wherein the predetermined constraint is a constraint that satisfies $\vec{h}+\vec{f}=1$, in which $\vec{f}$ is a vector with (R+1) components comprising a predetermined number R of components with a value of zero and one component with a value of one, the components corresponding to a highest-power path of useful paths, and in which $\vec{h}$ is a vector of the coefficients of the means for temporal filtering, the vector $\vec{h}$ used to produce the useful channel estimate at the output of the means for spatial filtering.

17. Multisensor radio receiver according to claim 13, wherein the predetermined constraint is a norm constraint, on a vector $\vec{h}$ of the coefficients of the means for temporal filtering, that satisfies $\vec{h}+\vec{h}=1$, the vector $\vec{h}$ used to produce a useful channel estimate at the output of the means for spatial filtering.

18. Multisensor radio receiver according to claim 14, wherein the predetermined constraint is a norm constraint, on a vector $\vec{h}$ of the coefficients of the means for temporal filtering, that satisfies $\vec{h}+\vec{h}=1$, the vector $\vec{h}$ used to produce the useful channel estimate at the output of the means for spatial filtering.

19. Multisensor radio receiver according to claim 13, further comprising:
means for updating coefficients of the means for spatial filtering, temporal filtering, and equalizing at a start of each information sequence in a frame; and means for estimating the coefficients of the means for spatial and temporal filtering using a demodulated information sequence and a learning sequence which follows the demodulated information sequence.

20. Multisensor radio receiver according to claim 14, further comprising:

means for updating coefficients of the means for equalizing and the coefficients of the means for spatial and temporal filtering at a start of each information sequence in a frame; and means for estimating the coefficients of the means for spatial and temporal filtering using a demodulated information sequence and a learning sequence which follows the demodulated information sequence.

21. Multisensor radio receiver according to claim 15, further comprising:

means for updating coefficients of the means for equalizing and the coefficients of the means for spatial and temporal filtering at a start of each information sequence in a frame; and means for estimating the coefficients of the means for spatial and temporal filtering using a demodulated information sequence and a learning sequence which follows the demodulated information sequence.

22. Multisensor radio receiver according to claim 16, further comprising:

means for updating coefficients of the means for equalizing and the coefficients of the means for spatial and temporal filtering at a start of each information sequence in a frame; and means for estimating the coefficients of the means for spatial and temporal filtering using a demodulated information sequence and a learning sequence which follows the demodulated information sequence.

23. Multisensor radio receiver according to claim 17, further comprising:

means for updating coefficients of the means for equalizing and the coefficients of the means for spatial and temporal filtering at a start of each information sequence in a frame; and means for estimating the coefficients of the means for spatial and temporal filtering using a demodulated information sequence and a learning sequence which follows the demodulated information sequence.

24. Multisensor radio receiver according to claim 18, further comprising:

means for updating coefficients of the means for equalizing and the coefficients of the means for spatial and temporal filtering at a start of each information sequence in a frame; and means for estimating the coefficients of the means for spatial and temporal filtering using a demodulated information sequence and a learning sequence which follows the demodulated information sequence.

25. Multisensor radio receiver according to claim 13, wherein the means for equalizing is a DFE equalizer.

26. Multisensor radio receiver according to claim 13, wherein the means for equalizing is a Viterbi equalizer.

* * * * *